US008908024B2

(12) United States Patent
Fedorenko et al.

(10) Patent No.: US 8,908,024 B2
(45) Date of Patent: Dec. 9, 2014

(54) SYSTEM FOR DETECTING AN ITEM WITHIN A SPECIFIED ZONE

(75) Inventors: Aleksandr Ivan Fedorenko, Newton, MA (US); Liwen Yu, Acton, MA (US); Carveth DeLeon, Brockton, MA (US)

(73) Assignee: Honeywell International Inc., Morristown, NJ (US)

( * ) Notice: Subject to any disclaimer, the term of this patent is extended or adjusted under 35 U.S.C. 154(b) by 511 days.

(21) Appl. No.: 13/172,784

(22) Filed: Jun. 29, 2011

(65) Prior Publication Data

US 2013/0002845 A1 Jan. 3, 2013

(51) Int. Cl.
*H04N 7/18* (2006.01)
*G08B 13/196* (2006.01)

(52) U.S. Cl.
CPC ................................ *G08B 13/19604* (2013.01)
USPC ................................................ 348/77; 454/56

(58) Field of Classification Search
CPC .... H04N 7/18; G08B 13/19604; B08B 15/02; B08B 15/023; B01L 1/50
USPC .......... 348/77; 454/56, 57, 58, 59, 60, 61, 62, 454/63, 64, 65, 66, 67
See application file for complete search history.

(56) References Cited

U.S. PATENT DOCUMENTS 4,528,898 A 7/1985 Sharp et al.
4,706,553 A 11/1987 Sharp et al.
4,893,551 A 1/1990 Sharp et al.
5,117,746 A 6/1992 Sharp
5,240,455 A 8/1993 Sharp
5,406,073 A 4/1995 Sharp et al.
5,882,254 A * 3/1999 Jacob .............................. 454/61
5,973,730 A * 10/1999 Tranchita et al. ............. 348/143
6,137,403 A 10/2000 Desrochers et al.
6,711,279 B1 3/2004 Hamza et al.
6,841,780 B2 1/2005 Cofer et al.
6,935,943 B2 8/2005 Desai
6,985,172 B1 * 1/2006 Rigney et al. ................. 348/149
7,176,440 B2 2/2007 Cofer et al.
7,184,585 B2 2/2007 Hamza et al.
7,768,549 B2 8/2010 Cofer
2008/0002856 A1 1/2008 Ma et al.
2009/0032011 A1 * 2/2009 Livchak et al. ................. 454/65
2009/0191803 A1 * 7/2009 Barrette et al. ................. 454/56

OTHER PUBLICATIONS

Li et al., Detection of Fume Hood Operator Based on Image Processing Technology, 2011 International Conference on Electric Information and Control Engineering (ICEICE), Apr. 15-17, 2011, pp. 4132-4135.*

* cited by examiner

*Primary Examiner* — Jay Patel
*Assistant Examiner* — Francis G Geroleo
(74) *Attorney, Agent, or Firm* — Seager Tufte & Wickhem LLC.

(57) ABSTRACT

The disclosure reveals a system for detecting one or more persons in a specified zone. A determination is whether there is a person in the zone. A presence determination module may indicate from a current image of the zone compared with a reference image of the zone, whether there is a person in or not in the zone. An illumination controller may assure that the zone is sufficiently illuminated for a current image sufficient for comparison with the reference image to determine a possible presence of a person in the zone. The illumination may be infrared. The system may be used to assure appropriate and adequate face velocity at a fume hood having the presence of a person and having minimal face velocity in the absence of a person at the fume hood.

17 Claims, 23 Drawing Sheets

SYSTEM FOR DETECTING AN ITEM WITHIN A SPECIFIED ZONE

BACKGROUND

The present disclosure pertains to detection systems and particularly to object or person detection systems. More particularly, the disclosure pertains to detection systems for particular areas.

SUMMARY

The disclosure reveals a system for detecting one or more items such as objects and/or persons in a specified zone. A determination is whether there is a person in the zone. A presence determination module may indicate from a current image of the zone compared with a reference image of the zone, whether there is, for example, a person in or not in the zone. An illumination controller may assure that the zone is sufficiently illuminated for a current image sufficient for comparison with the reference image to determine a possible presence of a person in the zone. The illumination may be infrared. The system may be used to assure appropriate and adequate face velocity at a fume hood having the presence of a person and having minimal face velocity in the absence of a person at the fume hood.

DESCRIPTION

Figure 1:
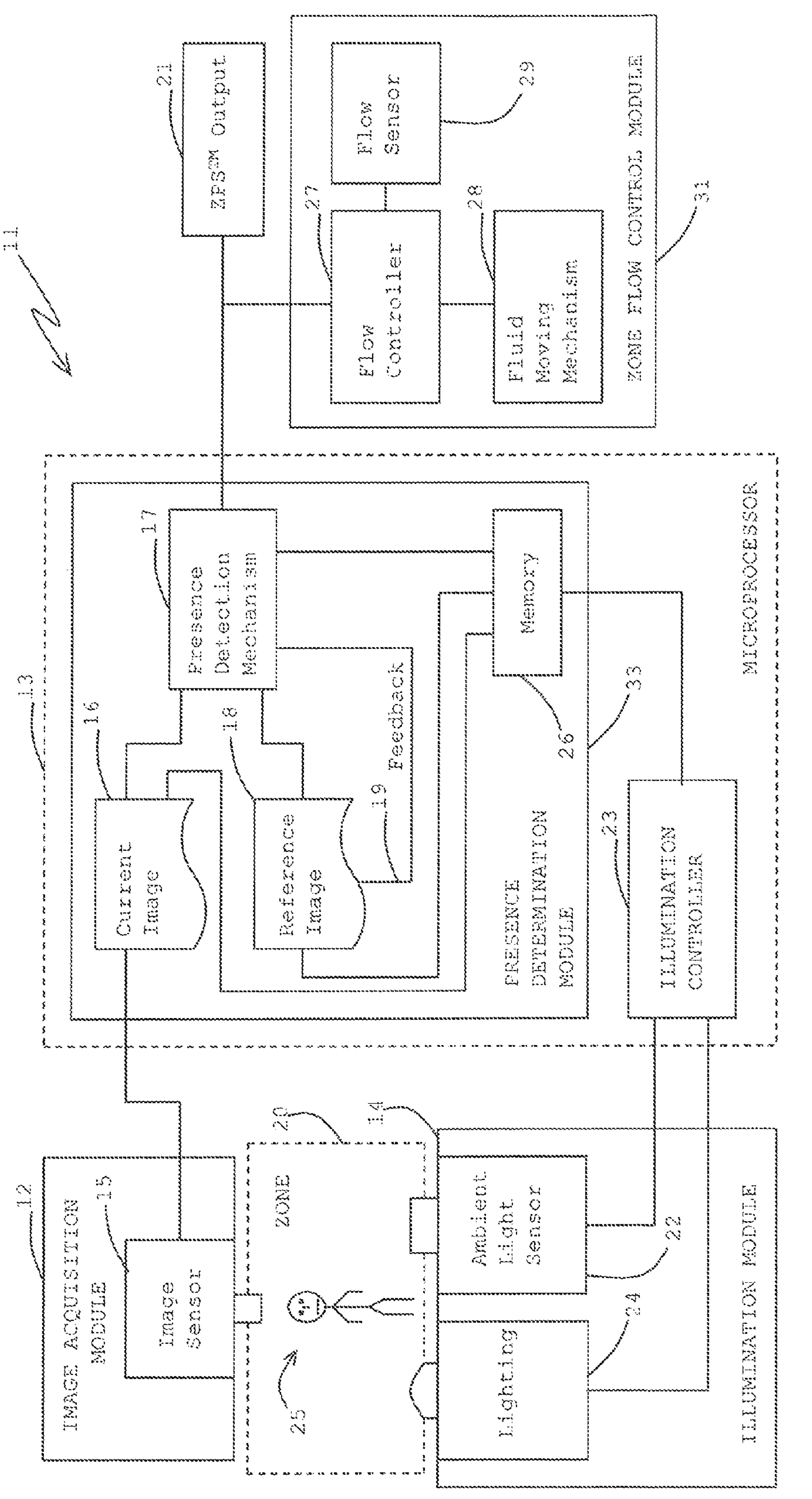
FIG. 1 is a diagram of a block schematic of a zone presence sensor system.

The present mechanism and approach may distinguish people and inanimate objects in a detection zone, for example, an area in front of a fume hood. When a person is detected in the zone, the system may increase face velocity of the hood to ensure safety. When the person leaves the detection zone, the system may decrease face velocity to save energy. If there is doubt about a presence of a person in the zone, then the system may maintain the increased face velocity of the hood to ensure safety. A default position of the system may be regarded as maintaining the increased face velocity of the hood.

Research by the American Society of Heating, Refrigeration and Air Conditioning Engineers (ASHRAE) and other like entities have shown that when there is no person working in front of the fume hood, it is safe to reduce the face velocity from the industry norm of 100 ft./min. to a lesser value—being 60 ft./min. for a normal-sized fume hood (i.e., between six feet and ten feet but nominally about eight feet in width). The reduction of face velocity may provide up to a 40 percent energy savings when sashes are left open and the fume hood is not occupied. A range for a reduced face velocity where there is no person in a specified zone in front of the fume hood may be from 45 ft./min. to 75 ft./min. A nominal value for the reduced face velocity may be 60 ft./min. A range for a regular face velocity where there is a person in the specified zone in front of the fume hood may be from 85 ft./min. to 115 ft./min. A nominal value for the regular face velocity may be 100 ft./min. These face velocity values may be appropriate for a normal-sized fume hood (i.e., between six feet and ten feet but nominally about eight feet in width). Various conditions and structural elements of, for example, an eight foot wide fume hood, may result in face velocities different from the nominal velocities stated herein. A significant aspect of the present disclosure is that the nominal velocities may be different for assuring safety of a person in the zone and achieving economy without compromising safety in a situation where a person is not in the zone.

The zone presence sensor system (ZPS™—a Honeywell International Inc. trademark) may create a detection zone in front of the fume hood to determine if a researcher or other person is in front of the hood or if the zone is vacant. If no person is present, the ZPS may send a signal to the fume hood control system which allows it to reduce the face velocity to a value deemed appropriate by applicable health and safety standards. If a person moves into the detection zone, the ZPS may send a signal to the fume hood control system to return to the operational face velocity ensuring that the safety and fume hood containment are maintained. The present controls usage, based control (UBC) system sub 1-second speed of response, may provide maximum energy saving for two-state and variable air volume (VAV) fume hoods without compromising safety.

Several aspects of the ZPS may be noted. The ZPS may detect an operator presence or absence and send a "normal" or "standby" signal to the fume hood control system. The fume hood control system may adjust the airflow to achieve the desired normal and standby face velocity setpoints. Inanimate objects may be mapped into the image background. A configurable detection zone may accommodate various fume hood widths and corridor depths. Infrared emitting diodes (IRED) may provide illumination for reliable detection in low or no light conditions. High resolution color image sensor technology and high speed algorithms may ensure proper detection in a wide variety of lighting conditions. The less than 1-second speed of response may ensure safe operation under various operating conditions. A single ZPS may provide protection for fume hoods of a nominal eight foot width. Multiple ZPSs may be used together for protection at double and four-sided fume hoods or significantly wide fume hoods. Comprehensive fail-safe schemes may return the fume hood to the safest state under fault conditions.

If the zone presence sensor system may capture a detection zone image, then an algorithm along with other components of an analysis mechanism may compare the image with a reference image stored in memory and output a high or low (HI/LO) voltage signal to indicate whether there is a detection of a person or object in the zone. The reference image may be dynamically updated to reflect a background change in the detection zone. The zone presence sensor system may work in both a well-lit environment and total darkness. The zone presence sensor system may be insensitive to moving shadows. Multiple zone presence sensor systems may be daisy-chained to cover a larger area.

The zone presence sensor system may incorporate the following modules: 1) an image acquisition module; 3) an infrared illumination module; and 3) a microprocessor. The image acquisition module may capture a real-time digitized image. The infrared module may sense lighting level and, via the microprocessor, turn infrared illumination on or off, accordingly, as needed for sufficient lighting in quality image acquisition. The infrared illumination may also have a variable intensity. The microprocessor may perform image processing and comparison, and input/output (IO) control.

FIG. 1 is a diagram of the zone presence sensor system 11 for detecting one or more people 25 within a specified zone 20. Detection by system 11 may be of objects as well as people. Use of the term "person" or "people" may also incorporate an object or objects, respectively, in the present description. An image acquisition module 12 may be connected to a microprocessor 13. An infrared module 14 may be connected to the microprocessor 13. The image acquisition module 12 may have an image sensor 15 for capturing a detection zone image. The image may be sent to a presence determination module 33 in microprocessor 13 to be held as a current image 16 in a memory 26 of module 33. The current image may be provided to a presence detection mechanism 17. A reference image 18 may be provided to the presence detection mechanism 17 where the current image 16 and reference image 18 may be compared to determine whether a person 25 is present within a specified zone 20. The reference image 18 may be updated with a feedback loop 19 in case of a change of image 16 at the specified zone 20 without a presence of a person 25, for instance, a change in background of the zone 20. If mechanism 17 indicates a difference between the current image 16 and reference image 18, such as, for example, an item absent in the reference image but present in the current image, then mechanism 17 may perform further analysis to determine whether such difference indicates a presence of a person 25, or not, in zone 20. Whether there is a person 25 in or not in zone 20 according to mechanism 17, a zone presence sensor system output 21 may have an indication which may be a high or low (HI/LO) signal noting a presence or absence, respectively, of a person 25 in zone 20. The indication from mechanism 17 may instead be of another kind.

A comparison of a current image 16 and a reference image 18 may incorporate comparing pixels of the current image and pixels of the reference image to detect a difference of pixels between the current image and the reference image. The comparison may be advanced, for example, in which the difference is analyzed to determine whether a person is present or not in the specified zone 20.

Output 21 may be connected to a zone flow control module 31. Output 21 may be specifically connected to a flow controller 27 which may control certain conditions within the zone, such as environmental conditions. An example application of controller 27 may be for a zone 20 of an example fume hood 35 shown in FIG. 3. Controller 27 may control a face velocity within a detection zone 20 at the fume hood 35. Face velocity may be caused by a fluid moving mechanism 28 of zone flow control module 31 which is connected to controller 27. Mechanism 28 may instead or also be a valve. Mechanism 28 may be regarded as fluid or flow control device. Also of module 31, a flow sensor 29 may be connected to controller 27. Flow sensor 29 may provide a quantitative measure of the face velocity. The face velocity may be increased if a person is detected in zone 20 for safety purposes. Face velocity may be decreased or stopped for economic purposes, such as saving energy used to move air through zone 20.

Lighting may be another component of sensor system 11. Infrared illumination module 14 may have an ambient light sensor 22 that senses an amount of lighting in zone 20 for adequate detection of a presence or non-presence of a person 25. Such indication may be provided to an illumination controller 23 in microprocessor 13. If the lighting is sufficient for detection purposes in zone 20, then the illumination controller 23 may do nothing. If the light is not sufficient, the illumination controller 23 may turn on a lighting arrangement 24. The lighting arrangement 24 may incorporate an infrared emitter source or a light source of another wavelength. The source may be a discrete on/off component or a component for providing a variation of lighting output. In case an emitter source has been off, or been on at a too low of an intensity level, lighting source or arrangement 24 may be turned on or increased in intensity to improve lighting in zone 20 so that image sensor 15 can obtain a current image 16 satisfactory for a determination by the presence detection mechanism 17 of whether a person 25 is present or not in zone 20.

Figure 2:
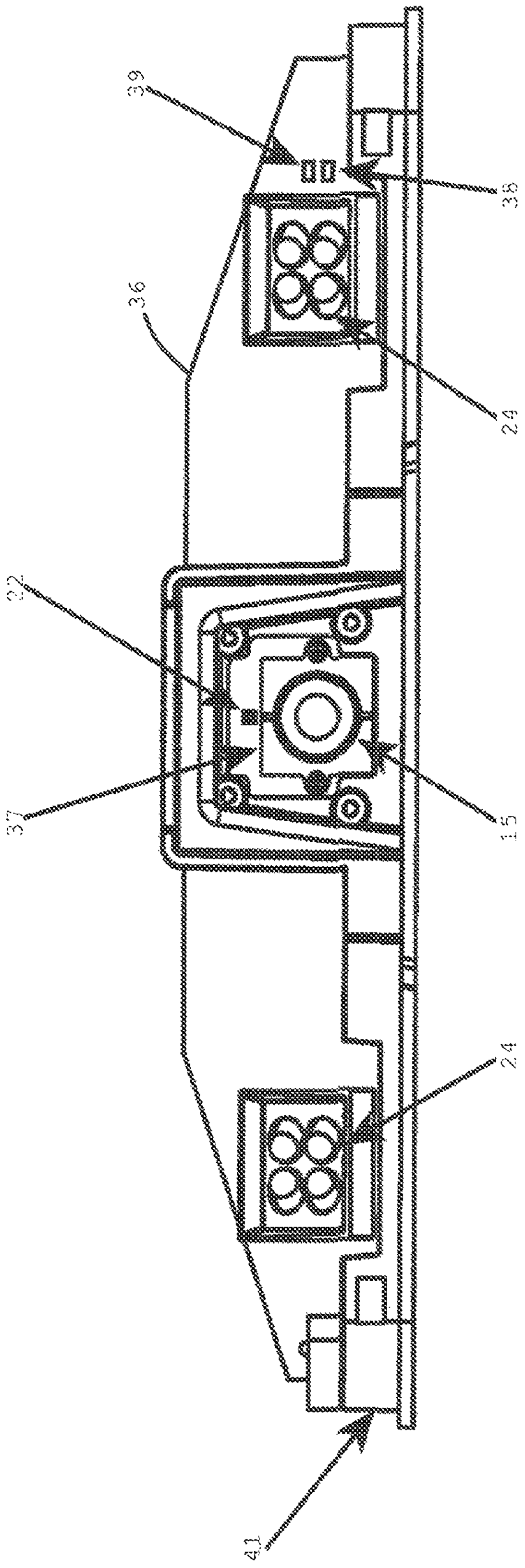
FIG. 2 is a diagram of an apparatus of a portion of the zone presence sensor system.

FIG. 2 is a diagram of a bottom view of a hardware enclosure 36 of the zone presence sensor system 11. Some items of the enclosure may incorporate infrared emitting diodes 24 on one side and infrared emitting diodes 24 on the other side of the zone for sensor system 11. Ambient light sensor 22 and image sensor 15 are shown in the diagram. A diagnostic light emitting diode (LED) 37, image LED 38 and power LED 39 are in the diagram of FIG. 2 although not necessarily explicitly noted in other diagrams of the present system. Other components of the presence determination module 33 may be situated in enclosure 36. External connections to components in enclosure 36 may be made via a USB connection 41.

Figure 3:
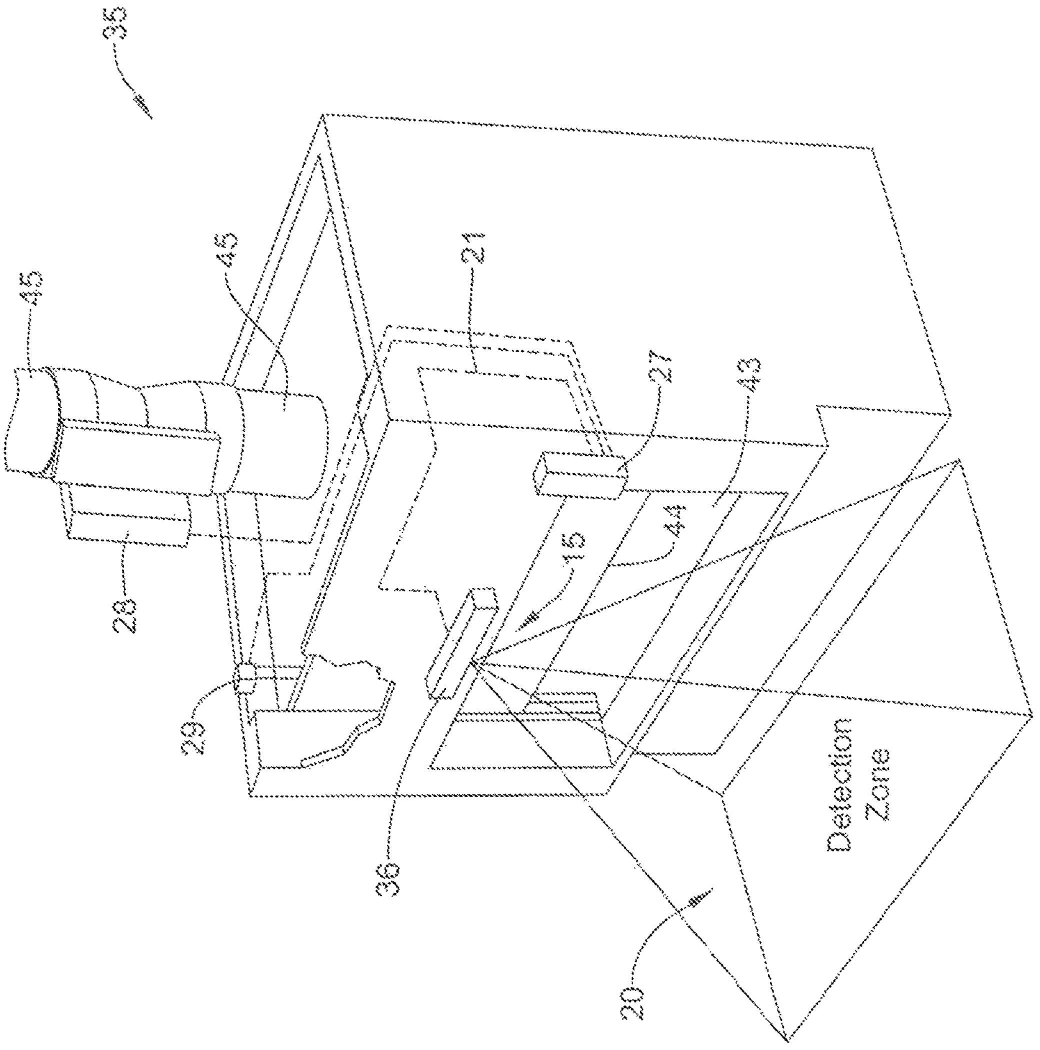
FIG. 3 is a diagram of an illustrative example of an application of the zone presence sensor system at a fume hood facility.
Figure 4:
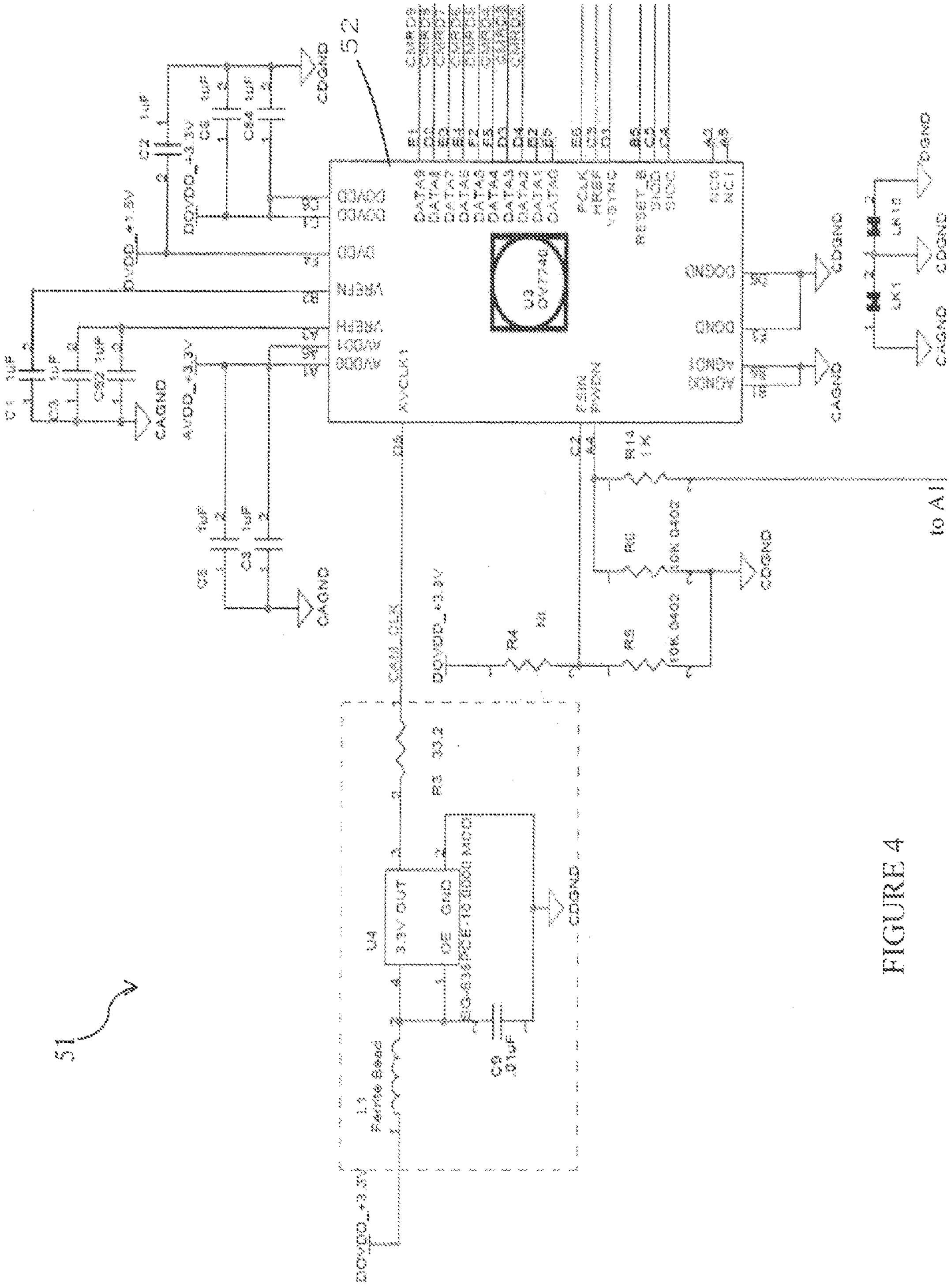
FIGS. 4-8 are schematics of an image sensor, microprocessor, and memory portions of a zone presence sensor system.
Figure 5:
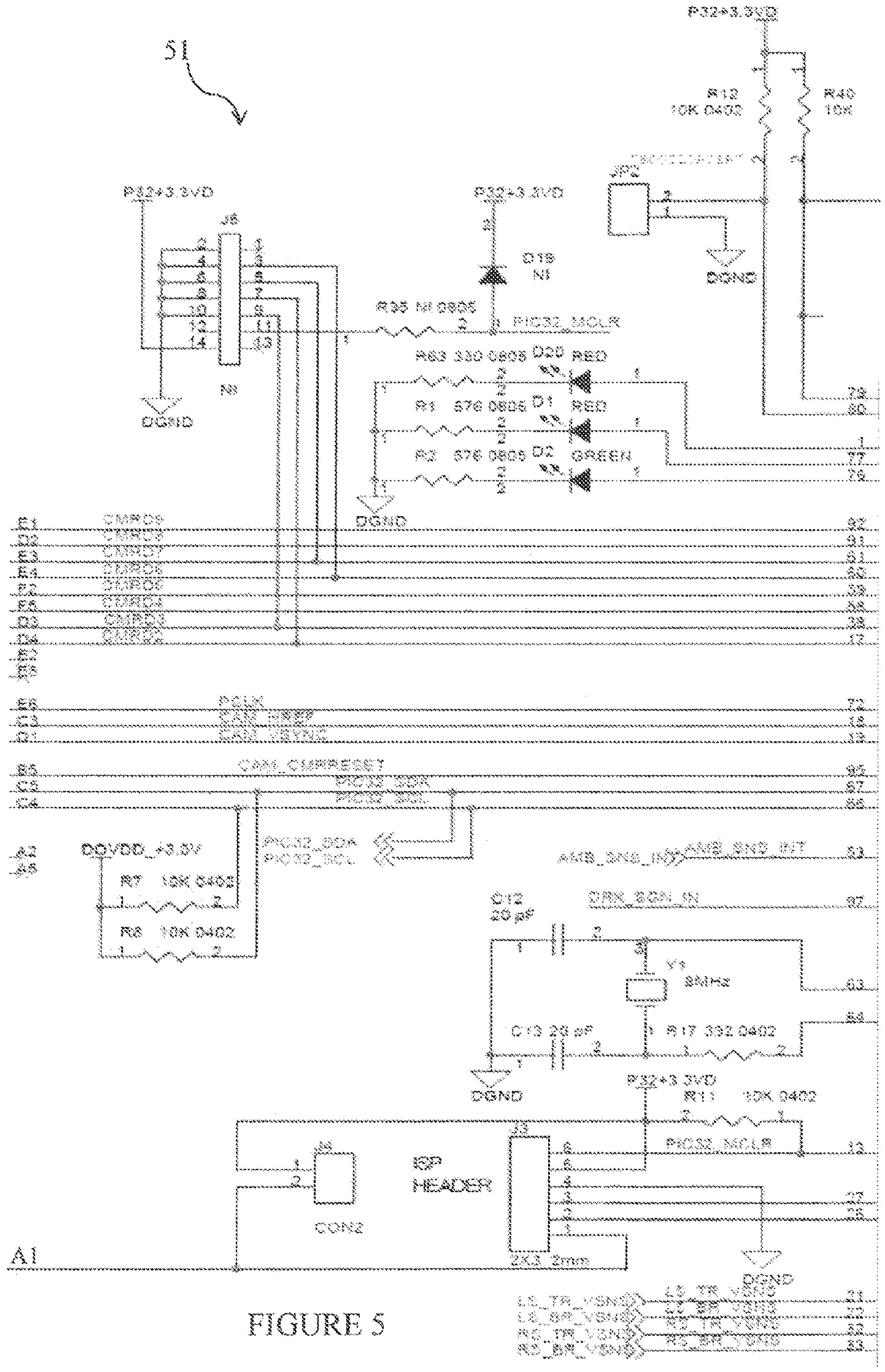
Figure 6:
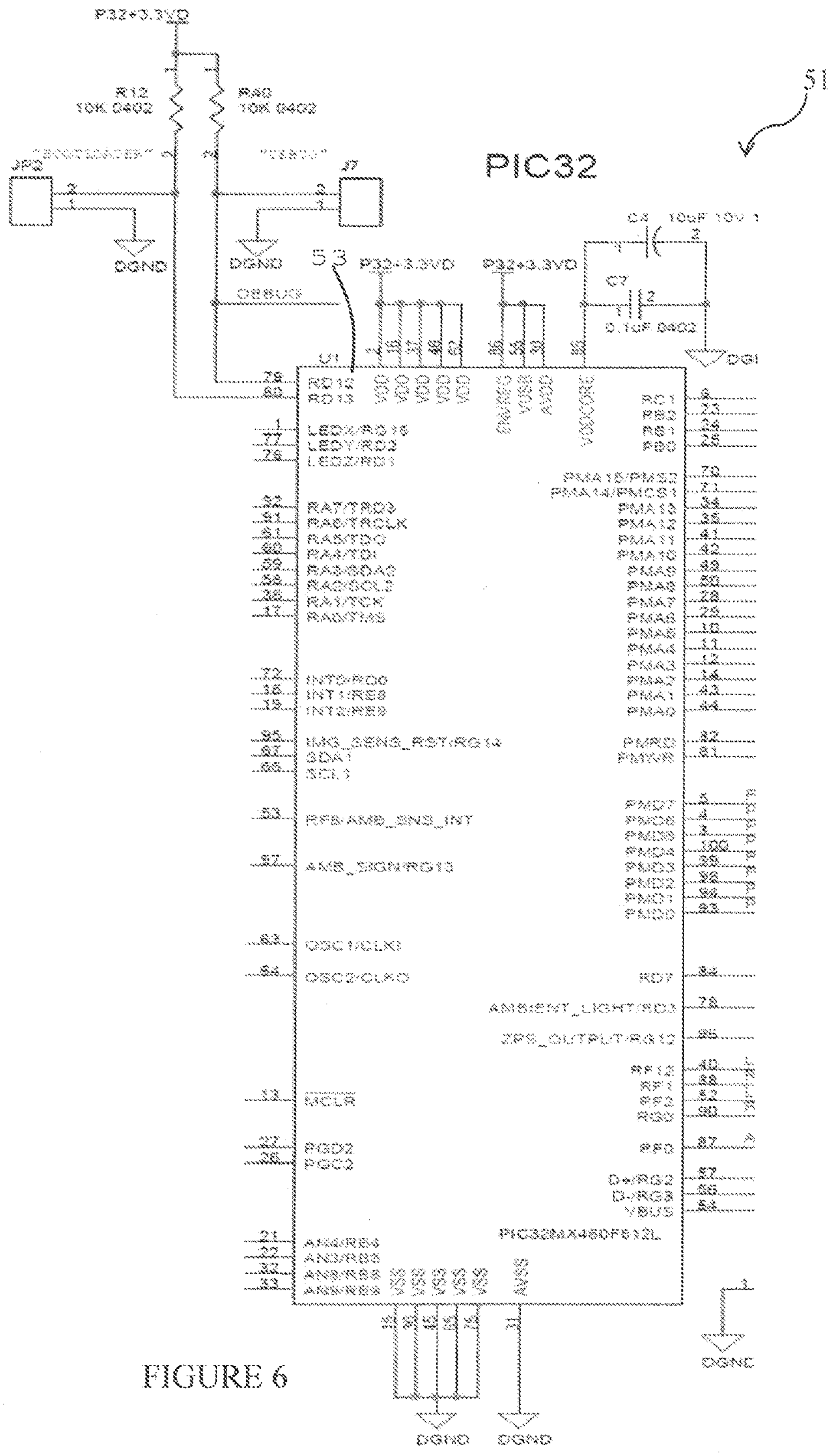
Figure 7:
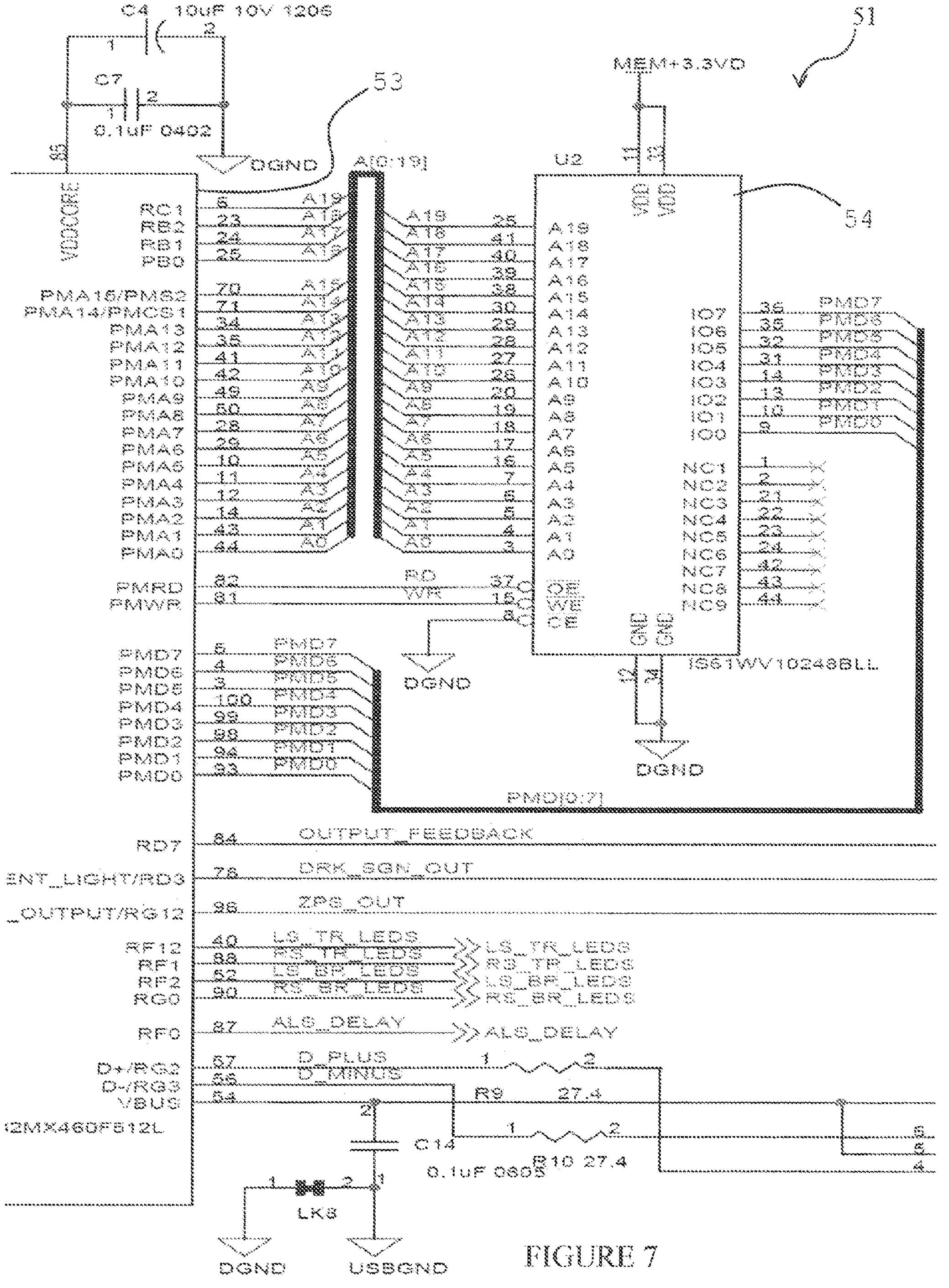
Figure 8:
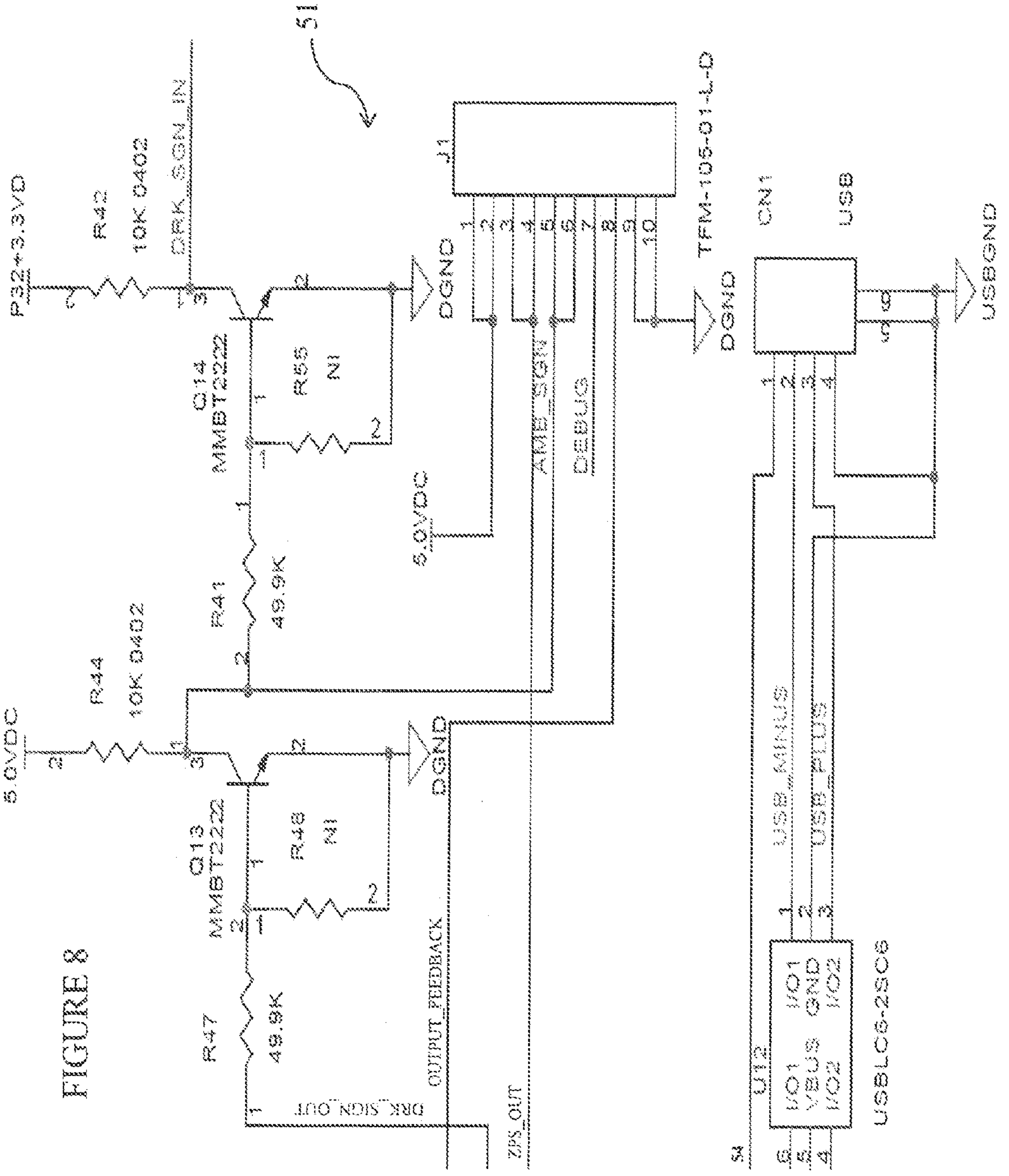

FIG. 3 is a diagram of an illustrative example of an application of the zone presence sensor system 11 in a fume hood 35. There may be other applications of sensor system 11. Detection zone 20 may be covered with image sensor 15 of zone presence sensor system 11. Fume hood 35 may have an opening 43 which may be closed with a sash 44. Hood 35 may have an exhaust port 45 with a valve or fluid moving mechanism 28. A person 25 (not shown) may stand in zone 20 to work with items situated in a volume behind opening 43 and slide-able sash 44 in fume hood 35. Output 21 may be connected to flow controller 27 on fume hood 35. Controller 27 may be connected to flow sensor 29 which protrudes into the compartment of fume hood 35, as shown by a cutaway of hood 35. Controller 27 may also be connected to the fluid moving mechanism 28, which may also be regarded as a fluid flow control mechanism, on exhaust port 45 of the compartment of hood 35. Exhaust port 45 may instead be an input to hood 35. The fluid in hood 35 may be air and/or other gas.

Schematics of FIGS. 4-23 show electronics for examples of the zone presence sensor system 11. FIGS. 4-8 show diagrams of a schematic that cover circuitry 51 which may represent image sensor 15 and various components of microprocessor 13 incorporating the presence determination module 33 and illumination controller 23 in FIG. 1. There may be connections and lines which are common to FIGS. 4-8. Circuitry 51 may reveal major components such as an image sensor 52 (OV7740), a processor 53 (PIC32MX460F512L) and a memory 54 (IS61WV10248BLL). The part numbers within the parentheses herein are merely example numbers designating parts which may be substituted with other kinds of similar parts. Other components and associated values may be selected as appropriate.

Figure 9:
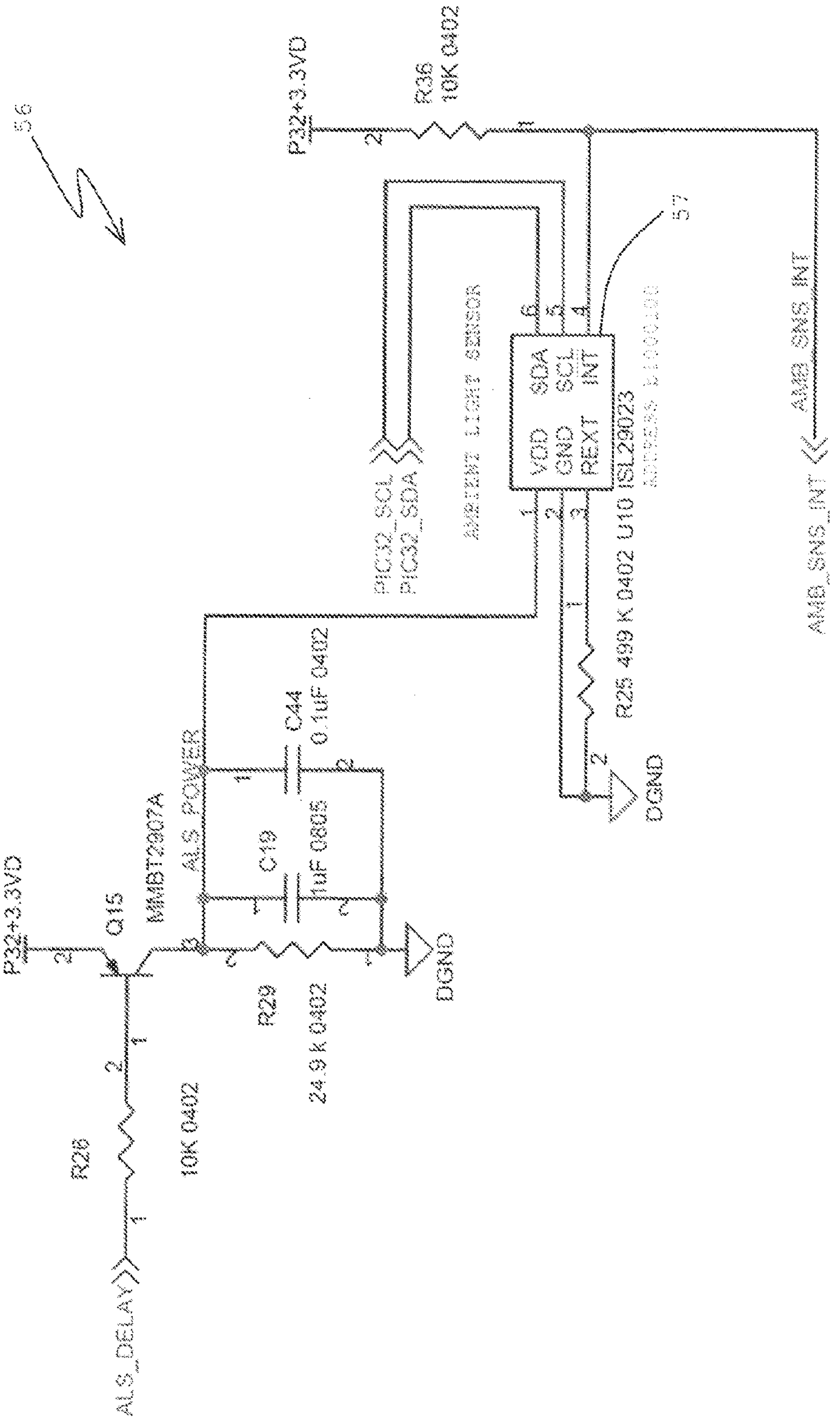
FIG. 9 is a schematic of an ambient light sensor for the zone presence sensor system.

FIG. 9 is a schematic showing circuitry 56 of an example ambient light sensor 57. Sensor 57 may be connected to circuitry 51 of FIGS. 4-8.

Figure 10:
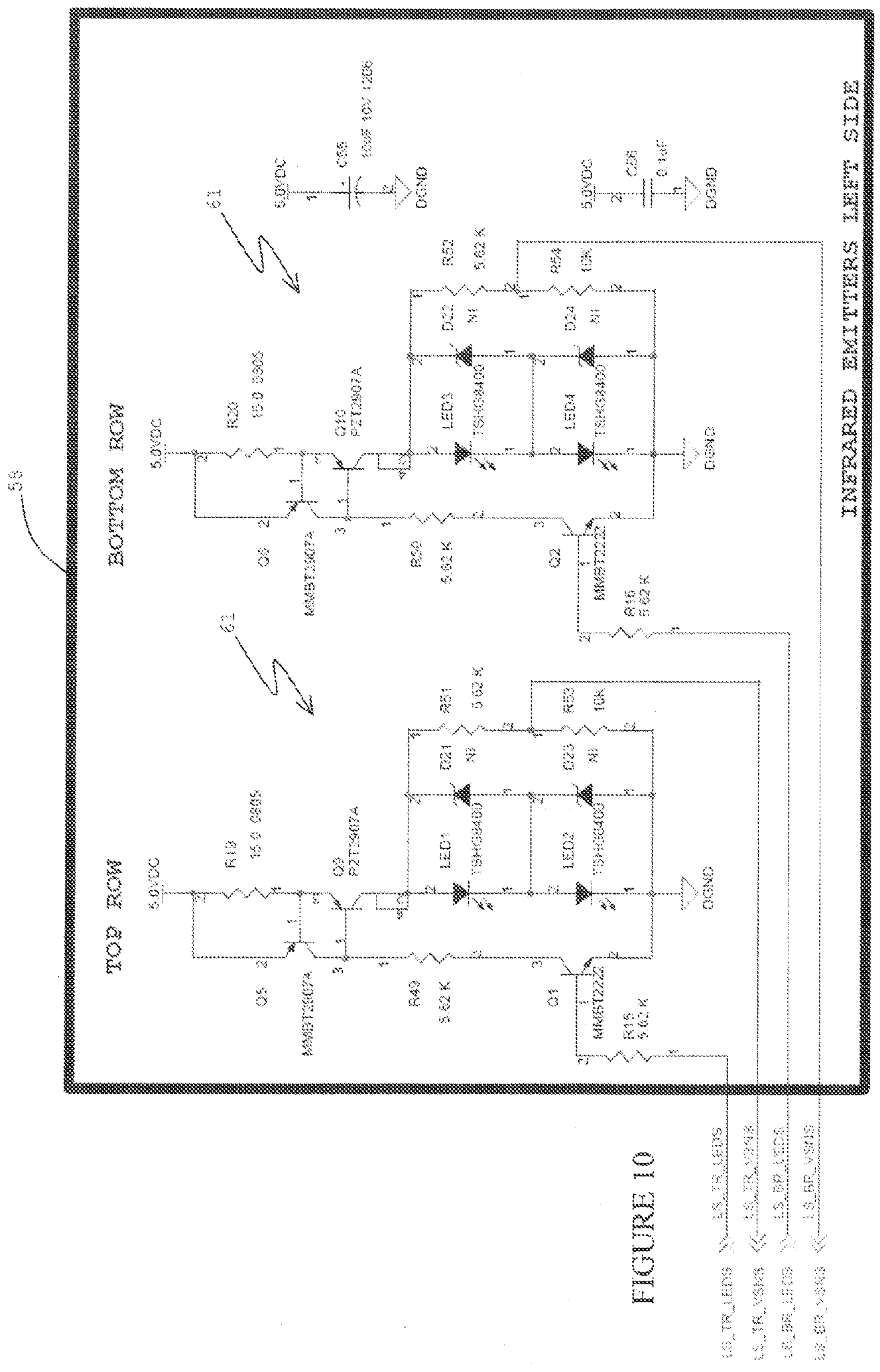
FIGS. 10 and 11 are schematics of the infrared lighting assembly for a zone being monitored by the zone presence sensor system.
Figure 11:
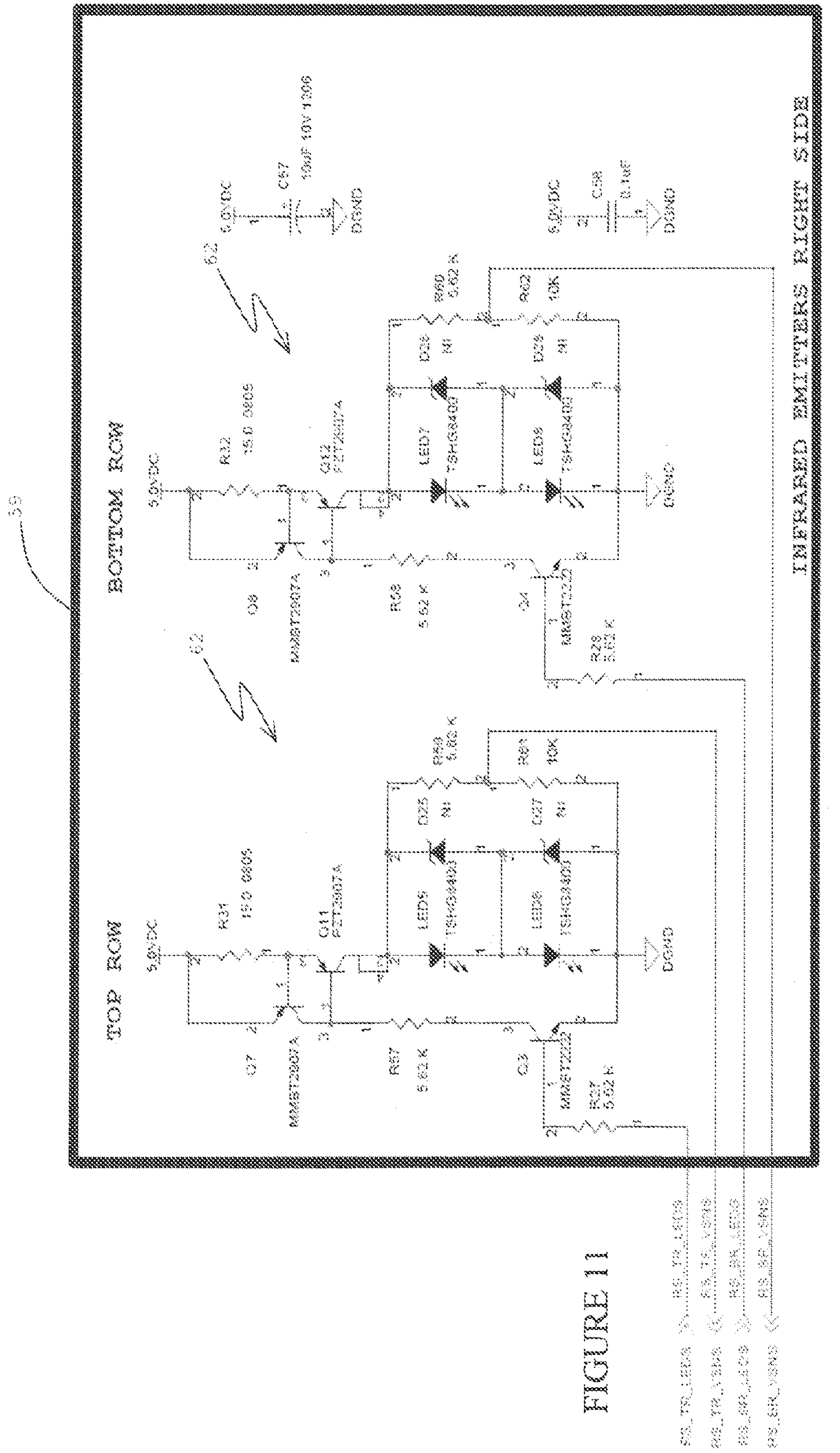
Figure 12:
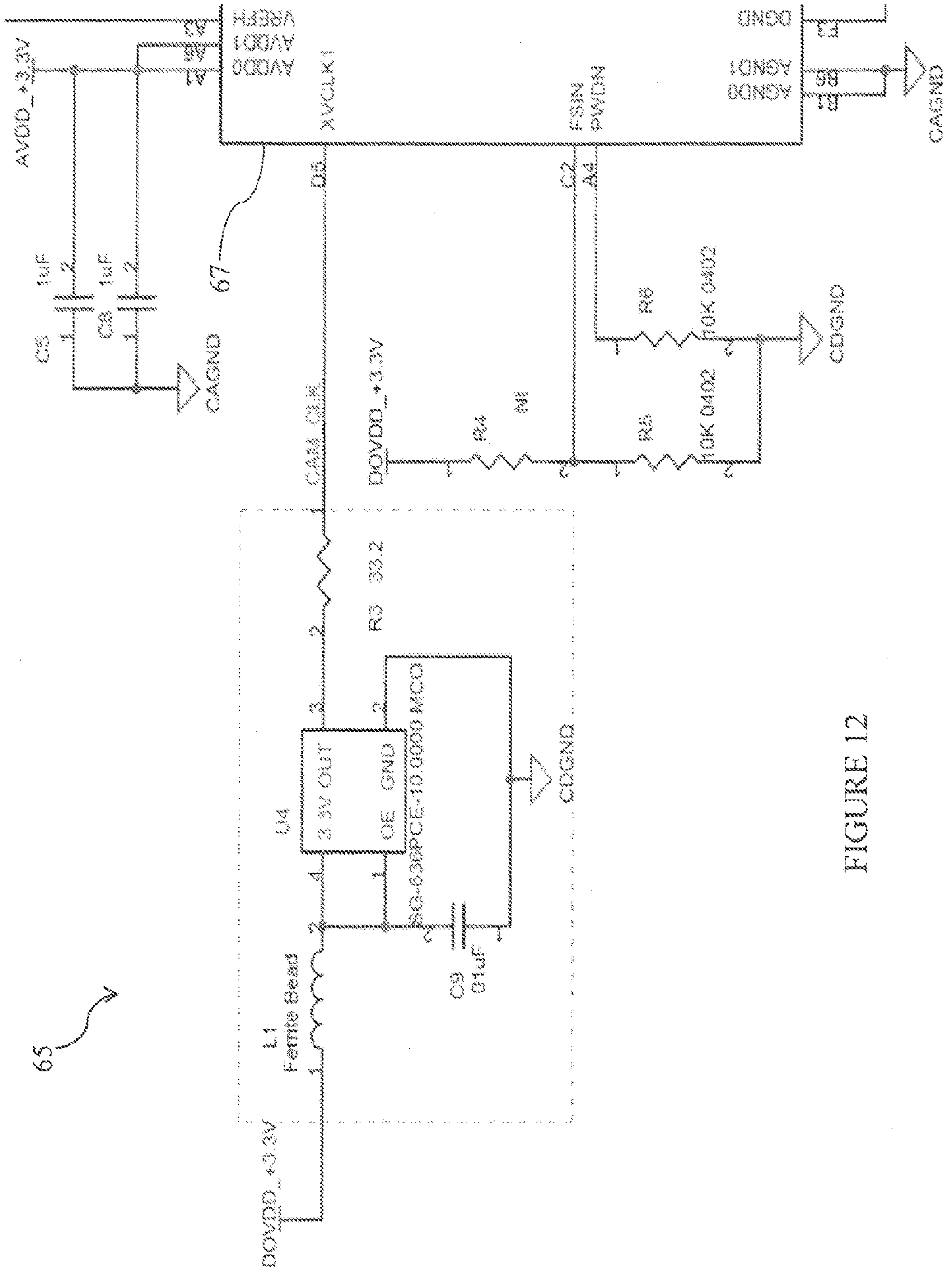
FIGS. 12-15 are schematics of an image sensor portion, a microprocessor portion, and a memory portion of another illustrative example of the zone presence sensor system.
Figure 13:
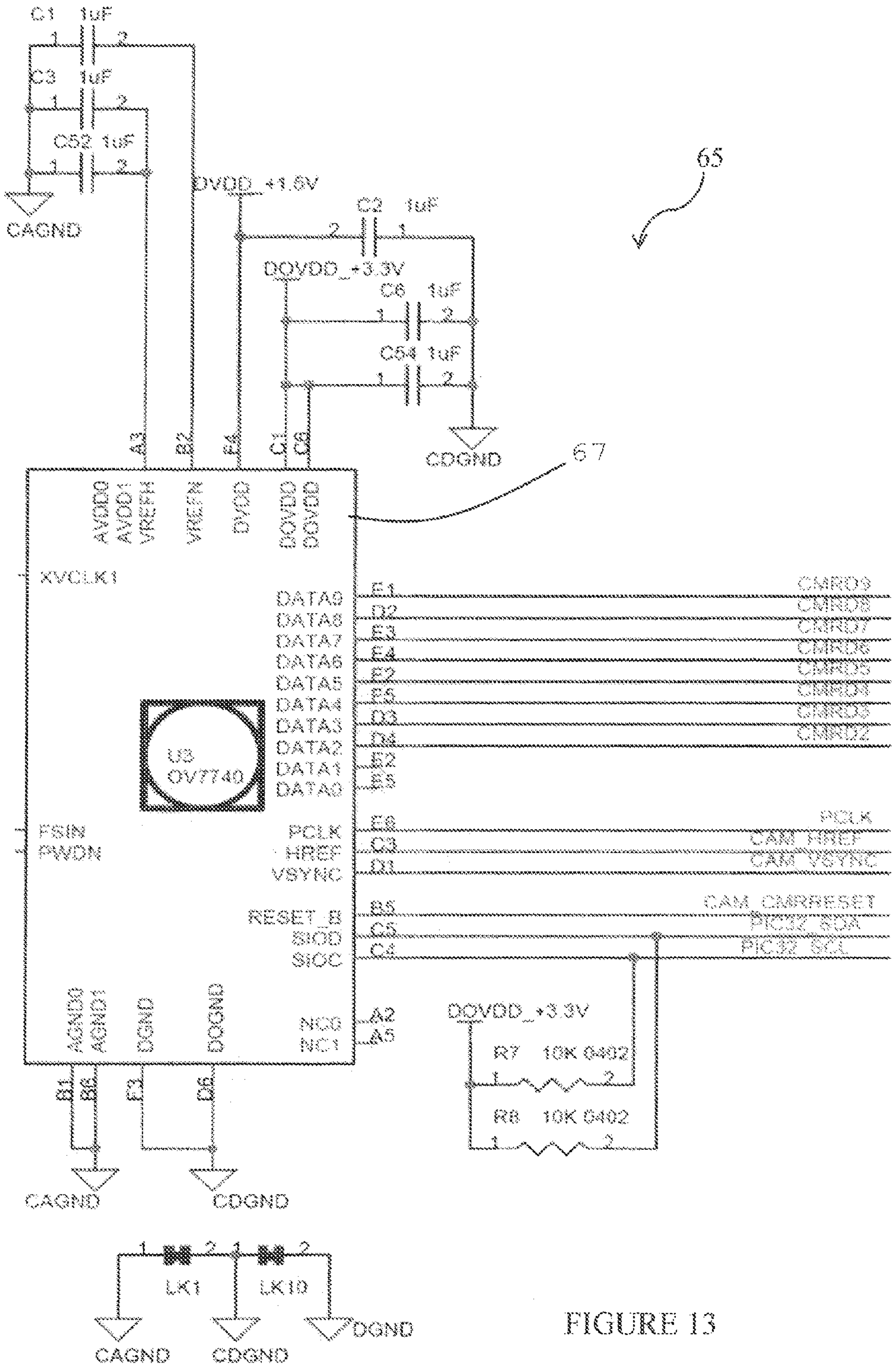
Figure 14:
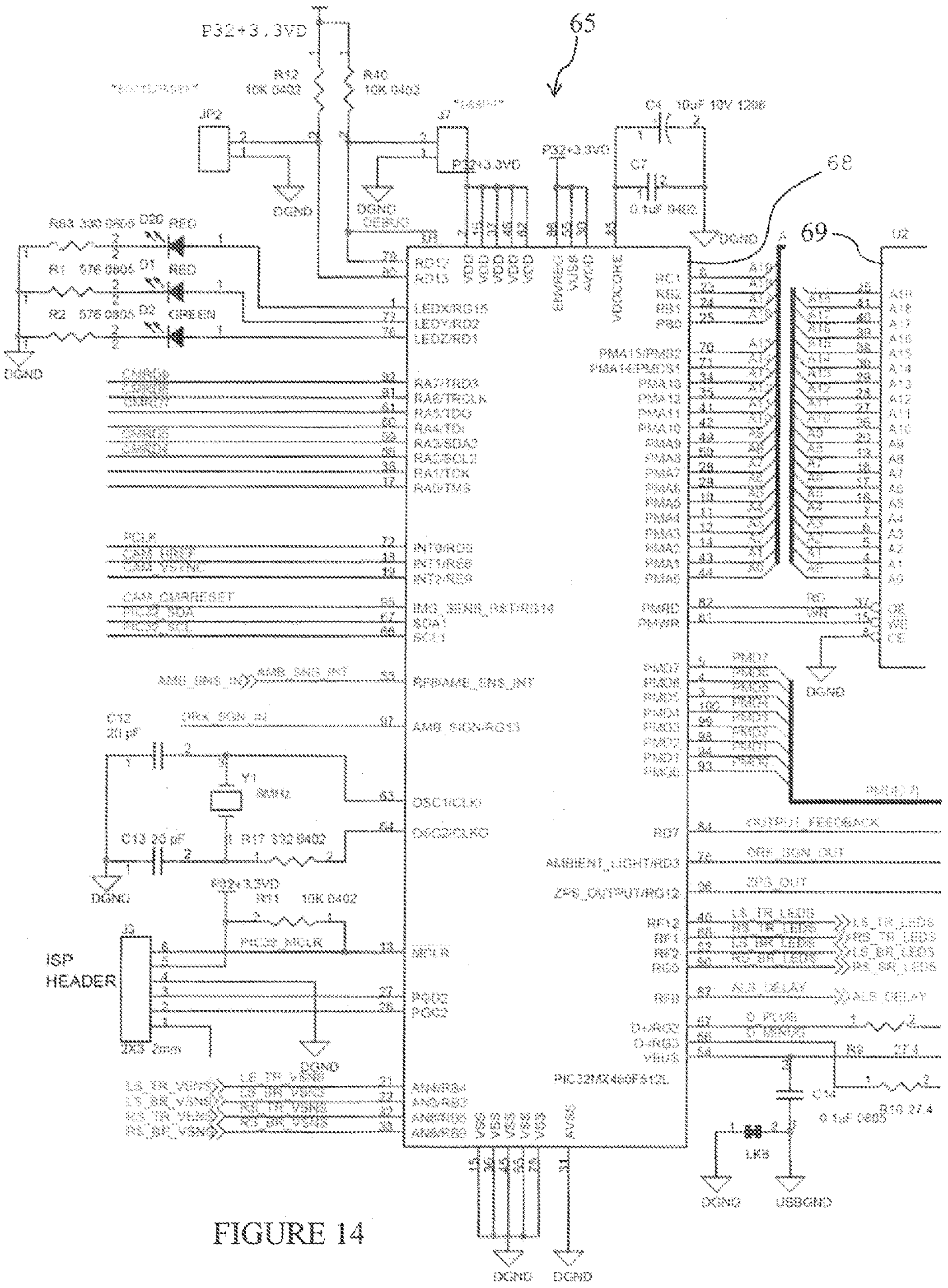
Figure 15:
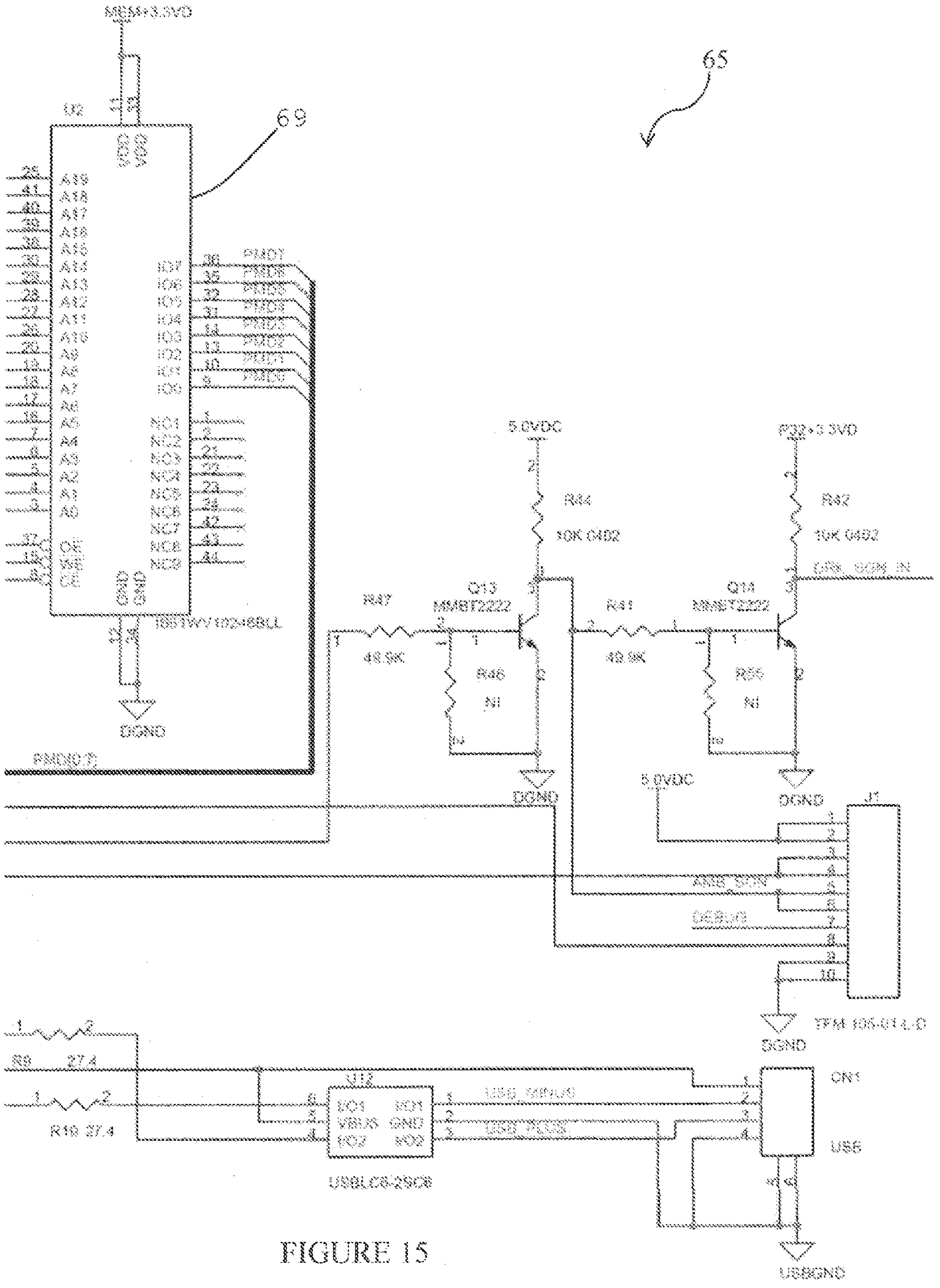

FIGS. 10 and 11 are diagrams of a schematic that may cover circuitry 58 and 59 incorporating infrared emitters 61 for lighting a left side of zone 20 (FIGS. 1-3), and of infrared emitters 62 for lighting a right side of zone 20, respectively.

FIGS. 12-15 are diagrams of a schematic that cover circuitry 65 which may be an alternative to circuitry 51 of FIGS. 4-8. There may be connections and lines which are 15 common to FIGS. 12-15. Circuitry 65 may reveal major components such as image sensor 67 (OV7740), processor 68 (PIC32MX460F512L) and memory 69 (IS61WV10248BLL). The part numbers within the parentheses are merely example numbers designating parts which may be substituted with other kinds of similar parts. Other components and associated values may be selected as appropriate.

Figure 16:
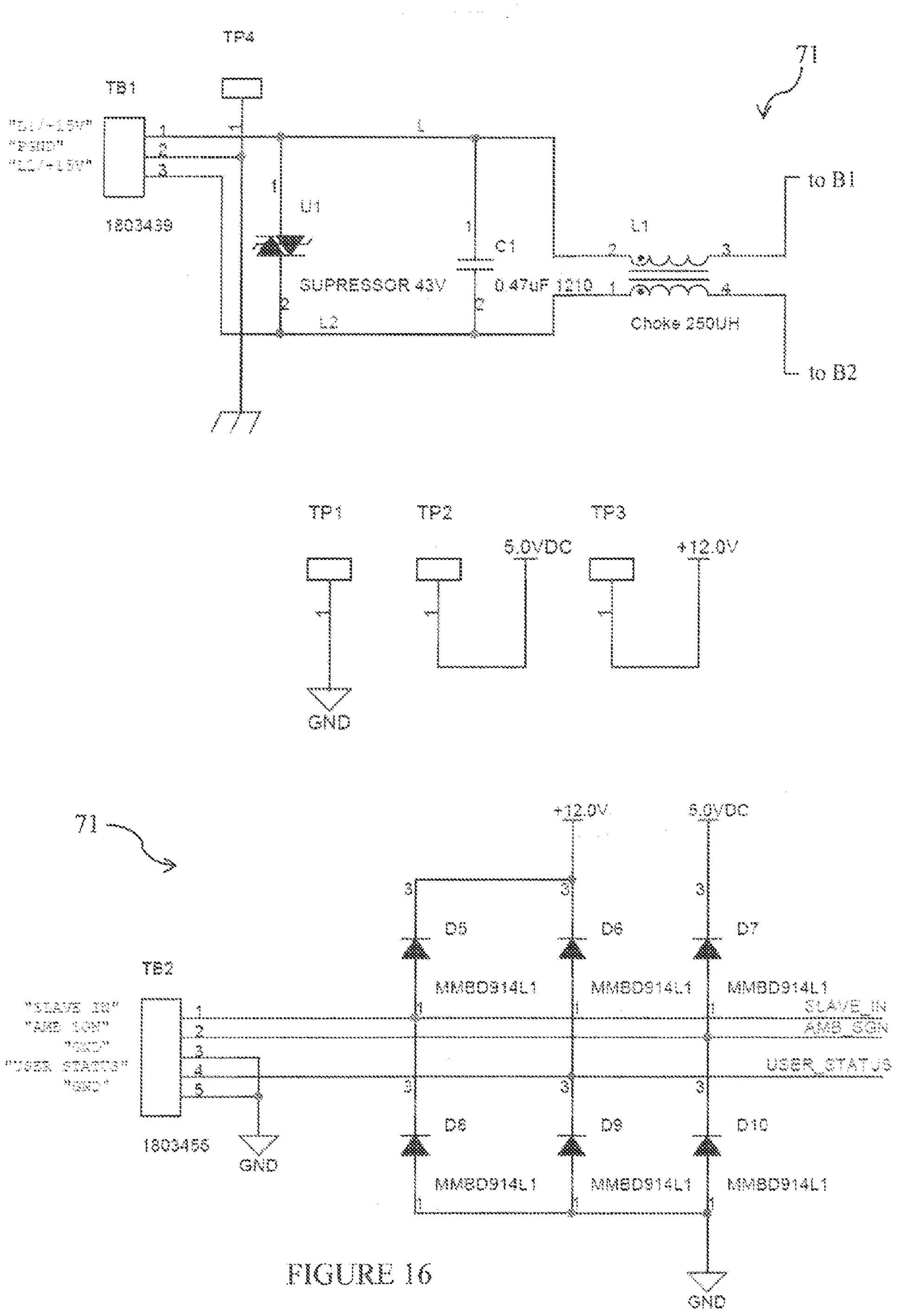
FIGS. 16-18 are diagrams of a schematic for an example power supply for the zone presence sensor system.
Figure 17:
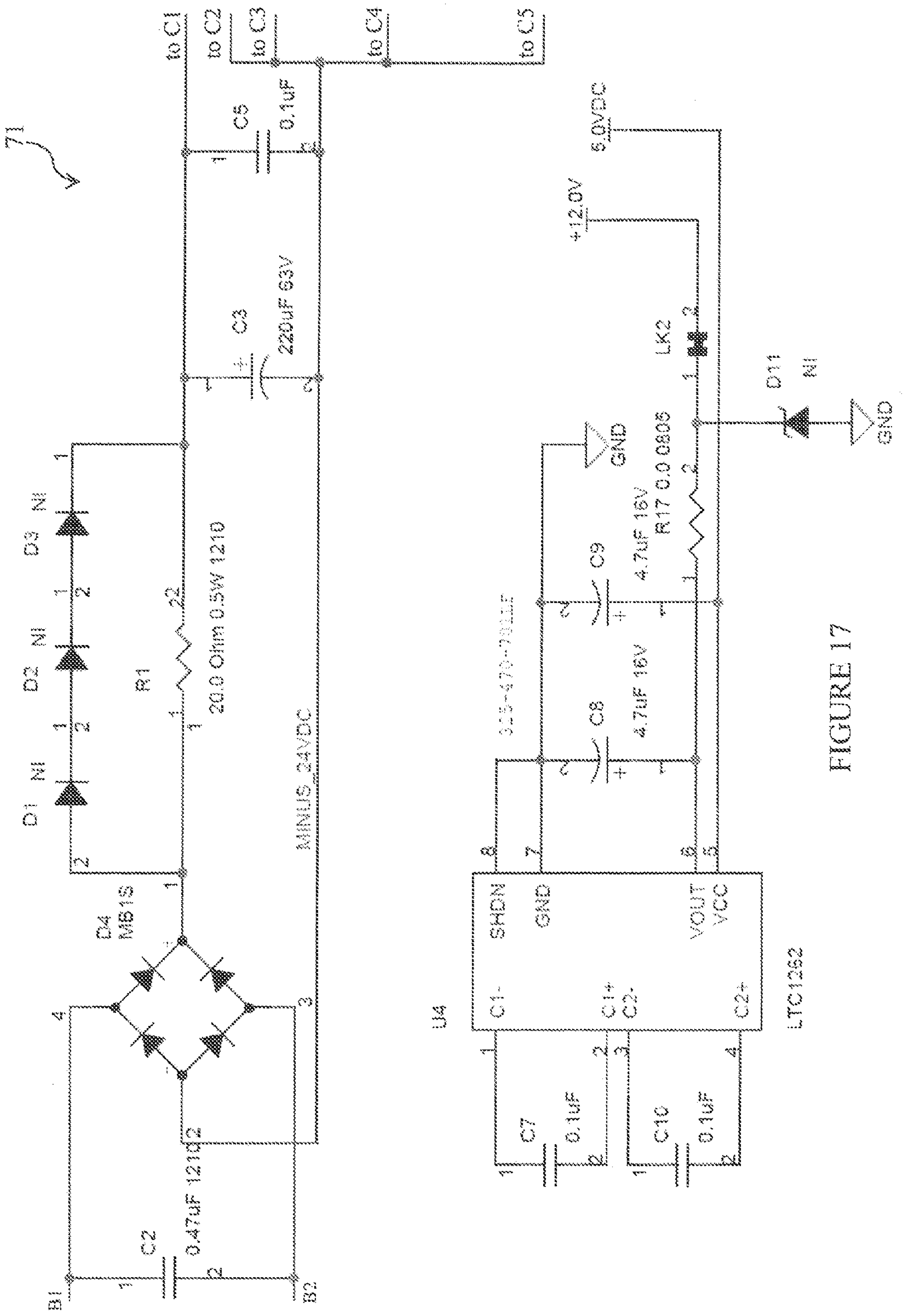
Figure 18:
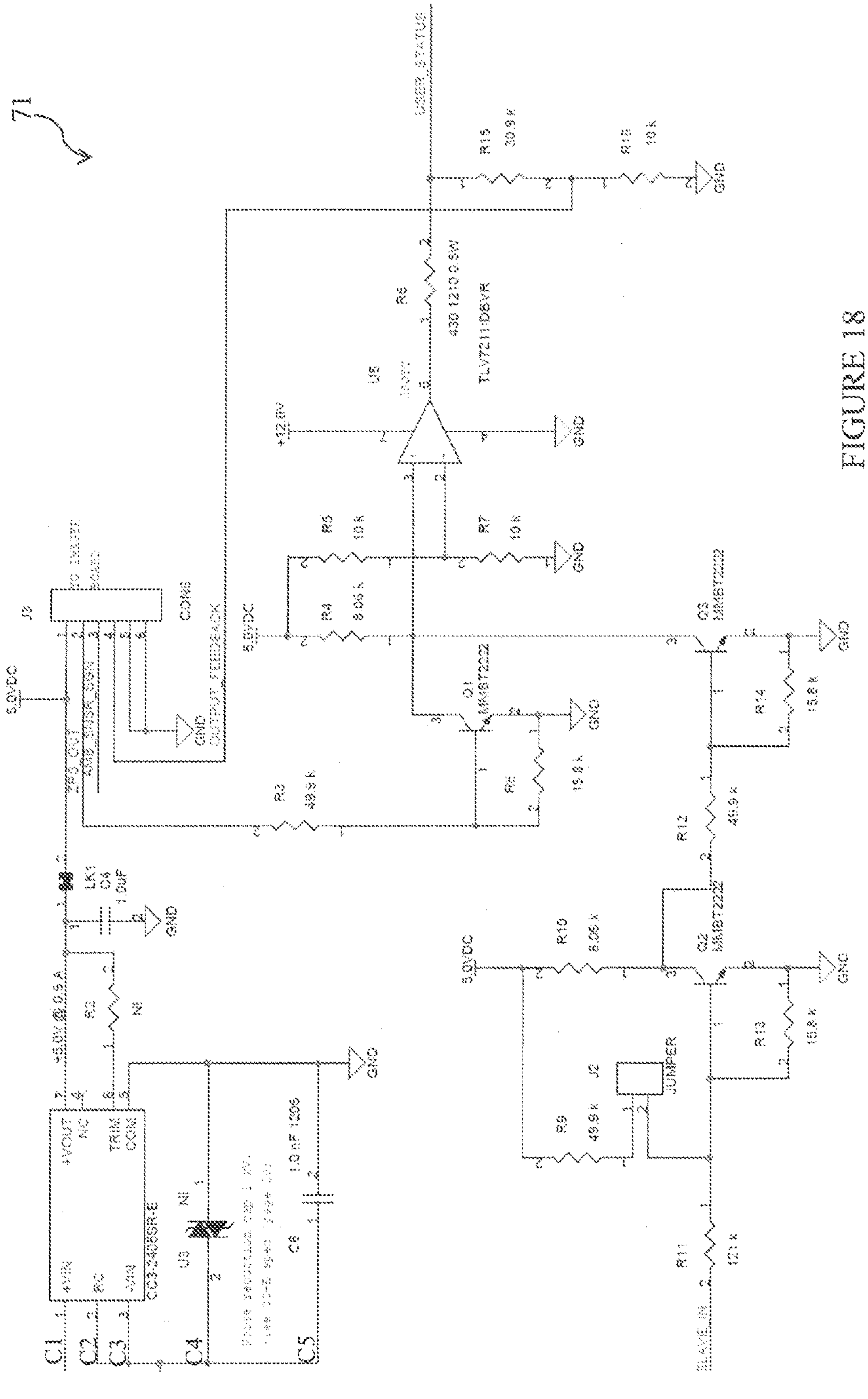

FIGS. 16-18 are diagrams of a schematic that may cover power supply circuitry 71 to support power needs for the circuitry 51 and 65 of FIGS. 4-8 and FIGS. 12-15, respectively. The components in these Figures and their respective values are merely examples which may be substituted with other components and/or values as appropriate.

Figure 19:
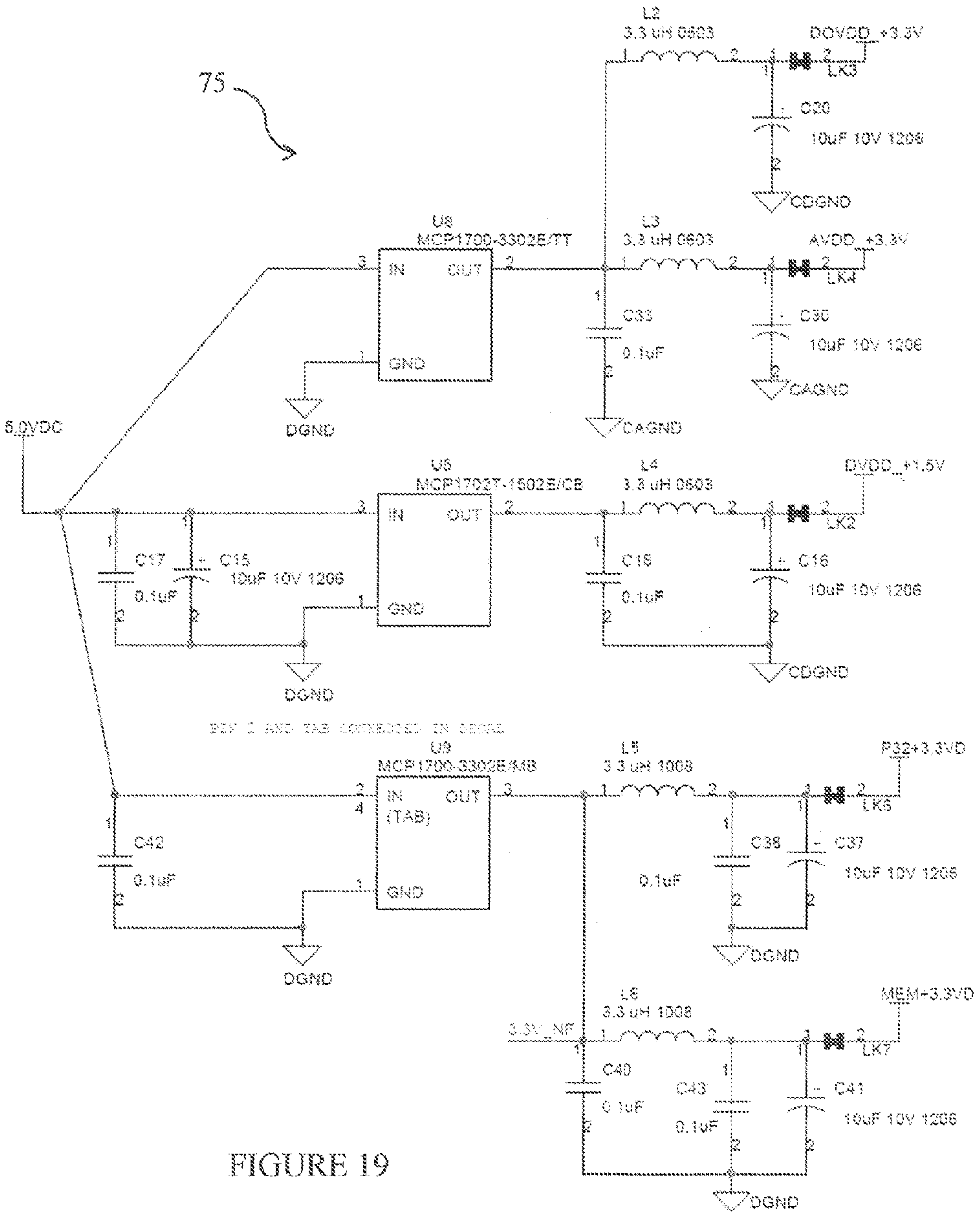
FIGS. 19-21 are a schematic of power supply circuitry and filtering for the illustrative example of the zone presence sensor system revealed in FIGS. 4-8.
Figure 20:
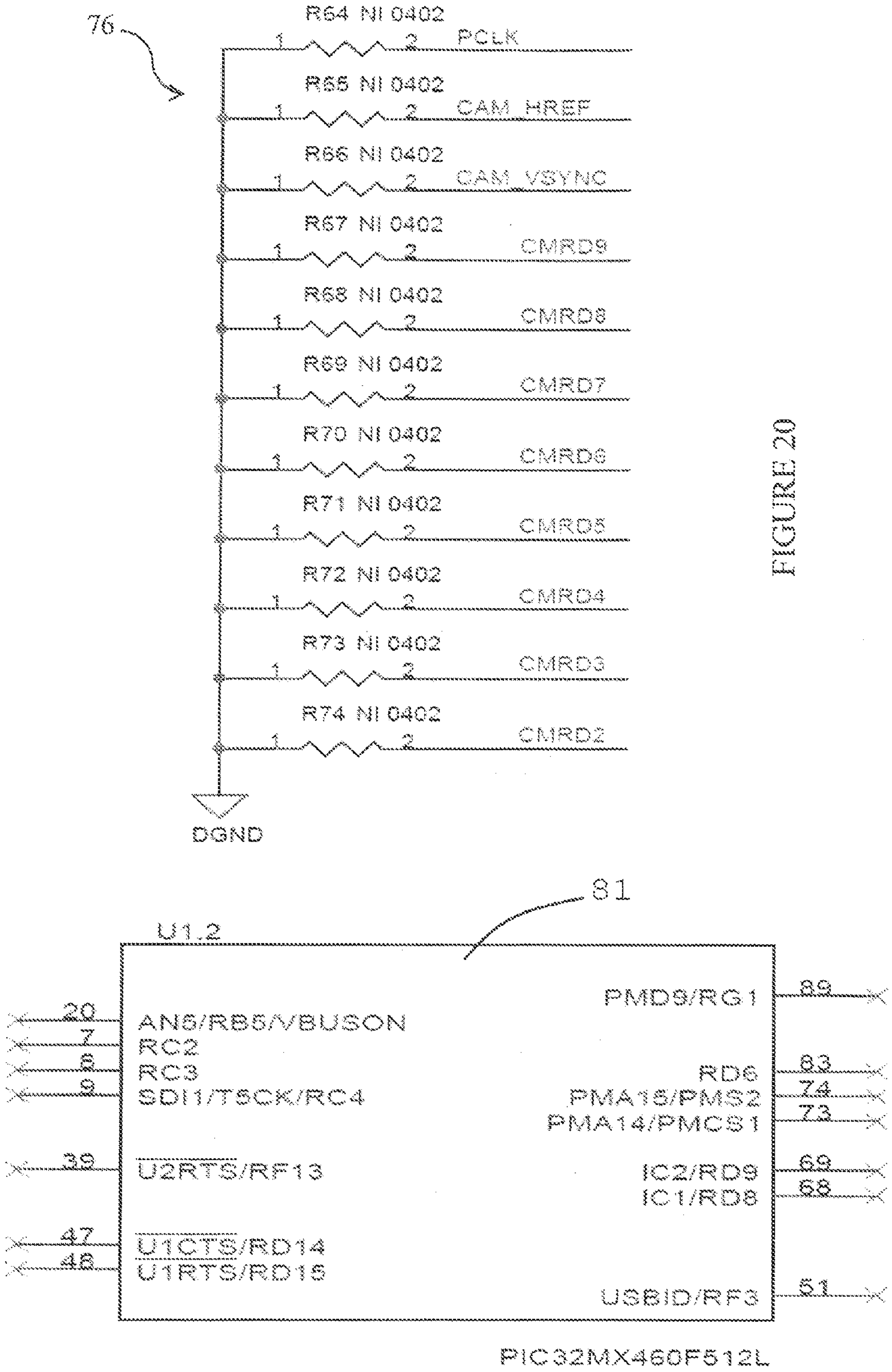
Figure 21:
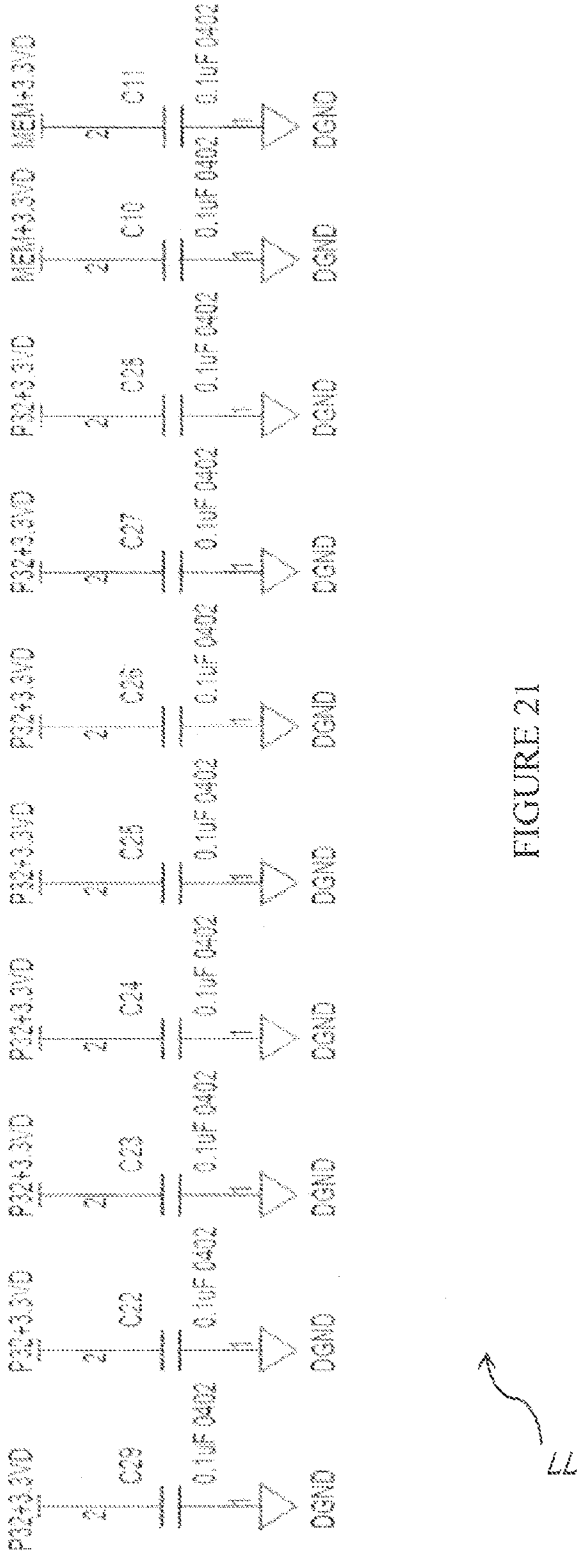

FIGS. 19-21 are diagrams of example power supply and filtering circuitry 75, 76 and 77 which may be used with circuitry 51 of FIGS. 4-8. Other examples of circuitry may be used in lieu of that shown in FIG. 19-21. Diagram 81 of FIG. 20 may indicate unused pins of processor 53 and/or processor 68.

Figure 22:
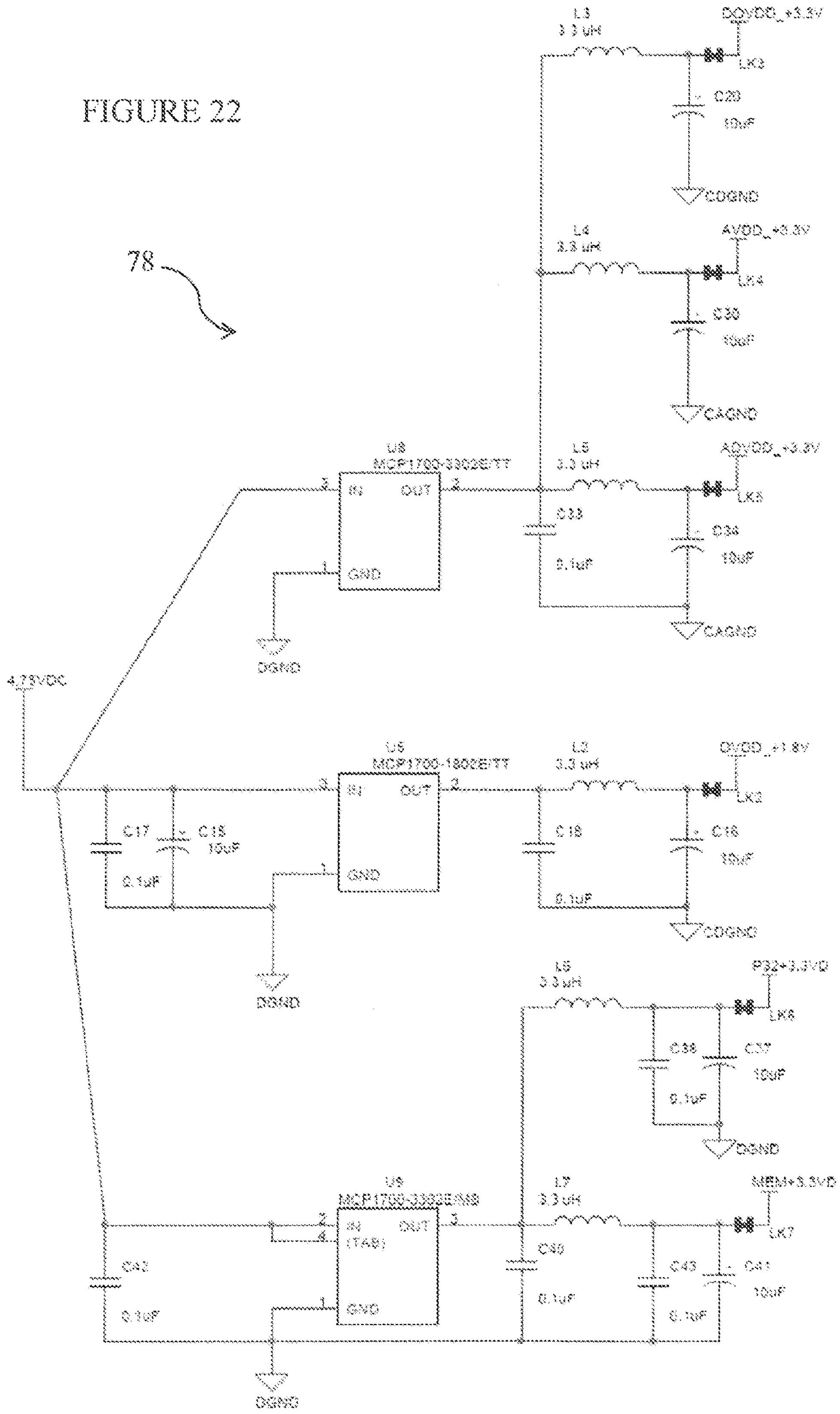
FIGS. 22-23 are schematics of power supply circuitry and filtering for the illustrative example of the zone presence sensor system revealed in FIGS. 9 and 10.
Figure 23:
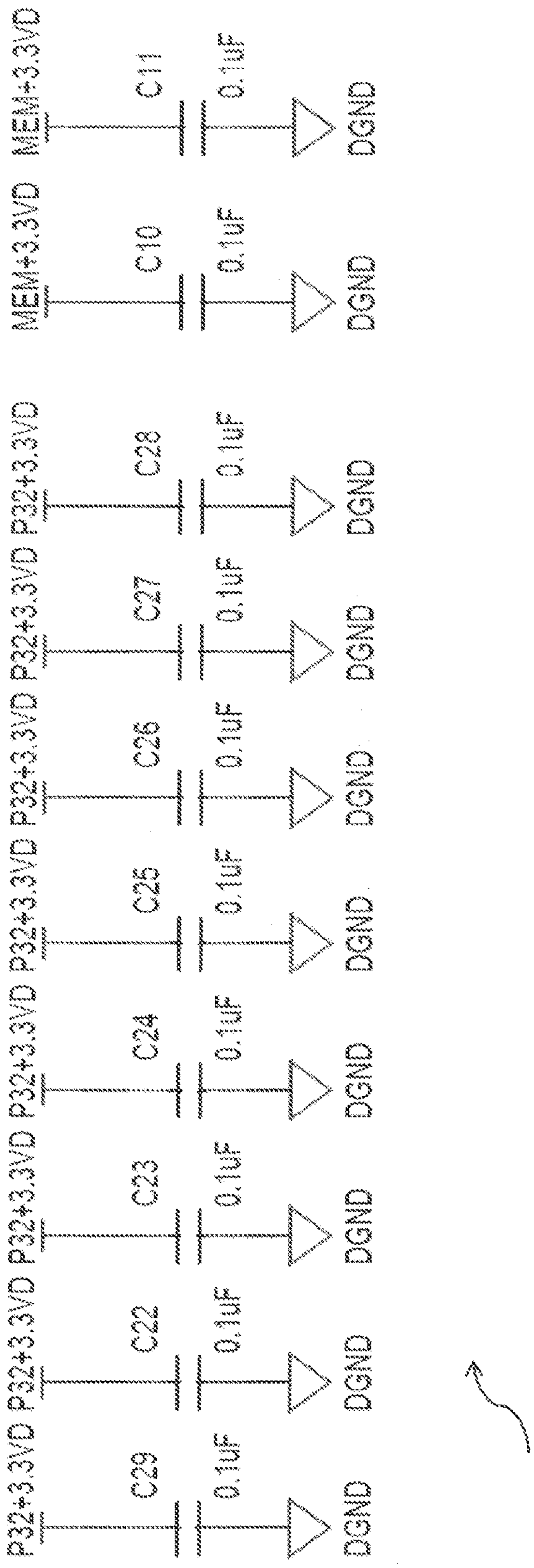

FIGS. 22 and 23 are a diagram of example power supply and filtering circuitry 78 and 79 which may be used with circuitry 65 of FIGS. 12-15. Other examples of circuitry may be used 5 in lieu of that shown in FIGS. 22 and 23.

A related U.S. Pat. No. 4,528,898, issued Jul. 16, 1985, and entitled "Fume Hood Controller", is hereby incorporated by reference. A related U.S. Pat. No. 4,706,553, issued Nov. 17, 1987, and entitled "Fume Hood Controller", is hereby incorporated by reference. A related U.S. Pat. No. 4,893,551, issued Jan. 16, 1990, and entitled "Fume Hood Sash Sensing Apparatus", is hereby incorporated by reference. A related U.S. Pat. No. 5,117,746, issued Jun. 2, 1992, and entitled "Fume Hood Sash Sensing Apparatus", is hereby incorporated by reference. A related U.S. Pat. No. 5,240,455, issued Aug. 31, 1993, and entitled "Method and Apparatus for Controlling a Fume Hood", is hereby incorporated by reference. A related U.S. Pat. No. 5,406,073, issued Apr. 11, 1995, and entitled "System for Detecting a Movable Entity within a Selected Space", is hereby incorporated by reference. A related U.S. Pat. No. 6,137,403, issued Oct. 24, 2000, and entitled "Sash Sensor and Method of Sensing a Sash Using an Array of Multiplexed Elements", is hereby incorporated by reference. A related U.S. Pat. No. 6,711,279, issued Mar. 23, 2004, and entitled "Object Detection", is hereby incorporated by reference. A related U.S. Pat. No. 6,841,780, issued Jan. 11, 2005, and entitled "Method and Apparatus for Detecting Objects", is hereby incorporated by reference. A related U.S. Pat. No. 6,935,943, issued Aug. 30, 2005, and entitled "Wireless Communications for Fume Hood Control", is hereby incorporated by reference. A related U.S. Pat. No. 7,176,440, issued Feb. 13, 2007, and entitled "Method and Apparatus for Detecting Objects Using Structured Light Patterns", is hereby incorporated by reference. A related U.S. Pat. No. 7,184,585, issued Feb. 27, 2007, and entitled "Object Detection", is hereby incorporated by reference. A related U.S. Pat. No. 7,768,549, issued Aug. 3, 2010, and entitled "Machine Safety System with Mutual Exclusion Zone", is hereby incorporated by reference. A related Patent Application Publication No. 2008/0002856, published Jan. 3, 2008, and entitled "Tracking System with Fused Motion and Object Detection", is hereby incorporated by reference. A related Patent Application Publication No. 2009/0191803, published Jul. 30, 2009, and entitled "Fume Hood System Having an Automatic Decommission Mode", is hereby incorporated by reference. Although the patent documents noted herein are incorporated by reference, the present disclosure may be regarded as having sufficient support for the claims.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A specified zone detection system comprising:

an image acquisition module situated at a specified zone, wherein the specified zone is defined adjacent a fume hood having an operable sash;

a presence determination module connected to the image acquisition module;

wherein:

the image acquisition module provides a current image of the specified zone;

the presence determination module comprises a reference image source;

the reference image source provides a reference image of the specified zone without a person present in the specified zone;

the presence determination module indicates from a comparison of the current image and the reference image whether there is a person present in the specified zone; and if the sash of the fume hood is open and the presence determination module cannot determine whether or not there is a person present in the specified zone, adjusting the airflow in the specified zone to assure that the specified zone is environmentally safe;

an illumination controller connected to the presence determination module;

an illumination module connected to the illumination controller;

an ambient light sensor in the specified zone;

a lighting arrangement situated at the specified zone; and wherein:

the ambient light sensor detects a magnitude of light in the specified zone; and if the magnitude of light is less than a predetermined level, then the lighting arrangement provides infrared light in the specified zone to increase the magnitude of light to at least the predetermined level.

2. The system of claim 1, wherein the comparison of the current image and the reference image comprises comparing pixels of a current image and pixels of a reference image to detect a difference of pixels between the current image and the reference image to indicate whether a person is present in the specified zone.

3. The system of claim 2, further comprising:
a face velocity controller connected to the presence determination module; and
the specified zone is for a person at a fume hood.
4. The system of claim 3, wherein:
if the presence determination module indicates that a person is present in the specified zone, then the face velocity controller sets a face velocity at the specified zone to a safe level;
if the presence determination module indicates an absence of a person in the specified zone, then the face velocity controller sets the face velocity to an energy-saving level; and
the face velocity at a safe level is greater than the face velocity at an energy-saving level.
5. The system of claim 4, wherein:
a face velocity at a safe level is between 85 ft. per minute and 115 ft. per minute; and
a face velocity at an energy-saving level is between 45 ft. per minute and 75 ft. per minute.
6. The system of claim 5, wherein the fume hood is between six and ten feet wide.
7. The system of claim 1, wherein:
the predetermined level is a magnitude of light for the image acquisition module to provide a current image of the specified zone sufficient for a comparison with the reference image to determine whether there is a person present in the specified zone.
8. The system of claim 1, further comprising:
a flow controller connected to the presence determination module;
a flow sensor connected to the flow controller; and a fluid control device connected to the flow controller; and
wherein:
the flow controller receives an indication from the presence determination module of whether there is a person present in the specified zone;
the flow controller provides a flow signal to a fluid control device in accordance with the indication of whether there is a person present in the specified zone and a flow velocity indicated by the flow sensor;
the flow signal directs the fluid control device to put the flow velocity at a first pre-selected magnitude or a second pre-selected magnitude;
if a person is present in the specified zone, the flow velocity in the specified zone is put at a first pre-selected magnitude; and
if a person is not present in the specified zone, the flow velocity in the specified zone is put at a second pre-selected magnitude.
9. The system of claim 8, wherein:
the specified zone is a fume hood zone;
the flow velocity is a face velocity at the fume hood zone;
the fluid comprises air and/or gas; and
the first pre-selected magnitude is greater than the second pre-selected magnitude.
10. The system of claim 9, wherein a default position of the system is for the fluid velocity to be put at the first pre-selected magnitude.
11. A method for determining a presence of a person in a zone, comprising:
capturing a current image of a specified zone, wherein the specified zone is defined adjacent a fume hood having an operable sash;
capturing a reference image of the specified zone without any person present in the specified zone;
comparing the current image of the specified zone with the reference image of the specified zone;
seeking one or more differences between the current image and the reference image;
determining whether the one or more of the differences exhibit a person in the specified zone;
providing and adjusting an airflow in the specified zone to a first level to assure that the specified zone is environmentally safe if a person is determined to be in the specified zone and the fume hood sash is open;
reducing the airflow in the specified zone from the first level to a second level if there is determined to be an absence of a person in the specified zone and the fume hood sash is open, wherein the second level of airflow is more economical than the first level of airflow, but maintains environmental safety in the specified zone;
monitoring the lighting in the specified zone to assure that the current image of the specified zone has sufficient quality for comparing the current image with the reference image; and
providing lighting as needed of the specified zone to assure that the current image of the specified zone has sufficient quality for comparing the current image with the reference image.
12. The method of claim 11, wherein the lighting comprises infrared lighting.
13. The method of claim 11, wherein if the one or more differences between the current image and the reference image cannot be determined to be or not to be a person in the specified zone, then the airflow in the specified zone is adjusted to assure that the specified zone is environmentally safe.
14. A presence sensor system comprising:
an image acquisition module situated in a fume hood operator zone of a fume hood having an operable sash;
a microprocessor connected to the image acquisition module; and
an illumination module connected to the microcontroller; and
wherein:
the microprocessor does a comparison of a current image of the operator zone from the image acquisition module with a reference image of the operator zone to determine if there is an item in the current image that is absent in the reference image;
the comparison of the current and reference images is made on a pixel by pixel basis;
the microprocessor provides an output based on pixel differences between the current and reference images to determine if there is an item in the current image that is absent in the reference image;
the illumination module provides infrared lighting at fume hood operator zone as needed for the microcontroller to do a comparison of a current image of the operator zone from the image acquisition module with a reference image of the operator zone to determine if there is an item in the current image that is absent in the reference images; and
wherein:
if an item is determined to be present in the fume hood zone and the fume hood sash is open, a face velocity is increased to a safe level;
if an item is determined to be absent from the fume hood zone and the fume hood sash is open, the face velocity is decreased to an energy-saving level, wherein the face velocity at the safe level is greater than the face velocity at the energy-saving level.

15. The system of claim 14, further comprising an illumination controller connected to the illumination module.

16. The system of claim 14, wherein if the comparison of the current and reference images determines that there is an item in the current image that is absent in the reference image, then the comparison is advanced to determine whether the item is a person.

17. The system of claim 15, wherein:

the illumination controller monitors the magnitude of light in the operator zone;

the illumination controller determines whether the magnitude of light in the operator zone falls below a predetermined threshold; and if the magnitude of the light in the operator zone falls below the predetermined threshold, the illumination controller controls the illumination module to provide infrared lighting in the operator zone to bring the magnitude of the light in the operator zone up to at least the predetermined threshold.

* * * * *